United States Patent
Becker et al.

(10) Patent No.: US 9,638,059 B2
(45) Date of Patent: May 2, 2017

(54) EXHAUST-GAS TURBOCHARGER

(75) Inventors: Martin Becker, Malsch (DE); André Seiler, Dittelsheim-Heβloch (DE)

(73) Assignee: BorgWarner Inc., Auburn Hills, MI (US)

(*) Notice: Subject to any disclaimer, the term of this patent is extended or adjusted under 35 U.S.C. 154(b) by 378 days.

(21) Appl. No.: 13/695,920

(22) PCT Filed: May 9, 2011

(86) PCT No.: PCT/US2011/035672
§ 371 (c)(1),
(2), (4) Date: Nov. 9, 2012

(87) PCT Pub. No.: WO2011/143079
PCT Pub. Date: Nov. 17, 2011

(65) Prior Publication Data
US 2013/0108483 A1    May 2, 2013

(30) Foreign Application Priority Data
May 14, 2010 (DE) .......... 10 2010 020 602

(51) Int. Cl.
*F01D 25/16* (2006.01)
*F01D 25/18* (2006.01)
(Continued)

(52) U.S. Cl.
CPC .......... *F01D 25/16* (2013.01); *F01D 25/166* (2013.01); *F01D 25/186* (2013.01); *F16C 17/18* (2013.01);
(Continued)

(58) Field of Classification Search
CPC . F04D 25/04; F02C 6/12; F01D 25/16; F01D 25/186; F01D 25/166; F16C 17/18;
(Continued)

(56) References Cited

U.S. PATENT DOCUMENTS 3,043,636 A * 7/1962 Macinnes ............. F01D 25/166
384/287
3,249,390 A * 5/1966 Schwartzman ....... B05C 17/003
384/110
(Continued)

FOREIGN PATENT DOCUMENTS

JP          05-125951 A      5/1993
JP       2002138846 A *   5/2002
(Continued)

OTHER PUBLICATIONS

13695920—Escape Trans—JP2008291810A.*
(Continued)

*Primary Examiner* — Theodore Stigell
*Assistant Examiner* — Jon Hoffmann
(74) *Attorney, Agent, or Firm* — A. Michael Tucker; Stephan A. Pendorf; Patent Central LLC (57) ABSTRACT

In the generic exhaust-gas turbocharger, the turbine-side and compressor-side radial bearing bush are of identical design. A more compact bearing space, and improvements in acoustics and rotor dynamics, are achieved by providing different bearings on the turbine and compressor sides.

19 Claims, 10 Drawing Sheets

(51) Int. Cl.
*F16C 17/26* (2006.01)
*F16C 17/18* (2006.01)
*F02B 39/00* (2006.01)

(52) U.S. Cl.
CPC .............. *F16C 17/26* (2013.01); *F02B 39/00* (2013.01); *F05D 2220/40* (2013.01); *F05D 2230/50* (2013.01); *F05D 2250/70* (2013.01); *F16C 2240/70* (2013.01); *F16C 2360/24* (2013.01)

(58) Field of Classification Search
CPC .. F16C 17/26; F16C 2360/24; F16C 2240/70; F05D 2220/40; F05D 2230/50; F05D 2250/70; F02B 39/00
USPC .......... 417/407, 477.1, 477.11, 477.9, 477.4, 417/477.6, 477.8, 477.2, 360, 476, 475; 415/111–112, 229; 384/145
See application file for complete search history.

(56) References Cited

U.S. PATENT DOCUMENTS

| | | | | |
|---|---|---|---|---|
| 3,390,926 A | * | 7/1968 | Woollenweber, Jr. | 384/287 |
| 3,605,441 A | * | 9/1971 | Hagemeister | 464/17 |
| 4,190,302 A | * | 2/1980 | Lynn | F16C 11/0614 277/361 |
| 4,370,106 A | * | 1/1983 | Lauterbach | F01D 25/16 384/126 |
| 4,640,630 A | * | 2/1987 | Yoshioka | F01D 25/164 384/129 |
| 4,838,711 A | * | 6/1989 | Munkel | F01D 25/164 384/215 |
| 4,986,733 A | * | 1/1991 | Fleury et al. | 415/230 |
| 5,087,176 A | * | 2/1992 | Wieland | 417/407 |
| 5,238,310 A | * | 8/1993 | Layfield | F16C 23/045 384/145 |
| 5,870,894 A | * | 2/1999 | Woollenweber | F02B 37/005 417/407 |
| 5,967,762 A | * | 10/1999 | Keller | F01D 25/16 417/407 |
| 6,017,184 A | * | 1/2000 | Aguilar et al. | 415/112 |
| 2004/0042698 A1 | * | 3/2004 | Yamamoto | F16C 17/02 384/291 |
| 2005/0287018 A1 | * | 12/2005 | Mavrosakis | 417/407 |
| 2007/0003175 A1 | * | 1/2007 | Petitjean et al. | 384/322 |
| 2008/0163622 A1 | | 7/2008 | Schlegl et al. | |
| 2010/0132358 A1 | * | 6/2010 | Purdey | F01D 25/166 60/605.3 |
| 2010/0284824 A1 | * | 11/2010 | Hippen | F01M 11/02 417/44.1 |

FOREIGN PATENT DOCUMENTS

| | | | |
|---|---|---|---|
| JP | 2005-163642 A | | 6/2005 |
| JP | 2007205179 A | * | 8/2007 |
| JP | 2007285252 A | * | 11/2007 |
| JP | 2008-082216 A | | 4/2008 |
| JP | 2008-522067 A | | 6/2008 |
| JP | 2008291810 A | * | 12/2008 |

OTHER PUBLICATIONS

13695920—Escape Trans—JP2007285252A.*
13695920—Escape Trans—JP2007205179A.*
13695920—Escape Trans—JP2002138846A.*
English language translation of Japanese Office Action dated Aug. 19, 2014, in Japanese Application No. 2013-510195.

* cited by examiner

EXHAUST-GAS TURBOCHARGER

BACKGROUND OF THE INVENTION

Field of the Invention

The invention relates to an exhaust-gas turbocharger according to the preamble of claim 1.

Description of the Related Art

In the generic exhaust-gas turbocharger, the outer and inner bearing widths of the turbine-side radial bearing bush are arranged axially within the bearing bore of the bearing housing. Here, the bearing spacing is the spacing between the axial centers of the two bearing bushes. Said bearing spacing has a significant influence on the rotor stability, which is also determined to a large extent by the design of the inner and outer lubricating oil gaps.

On the other hand, owing to the demand for ever more compact installation spaces, as small a bearing space as possible is required, which adversely affects the stability of the bearing.

It is therefore an object of the present invention to provide an exhaust-gas turbocharger of the type specified in the preamble of claim 1 which permits an improvement in rotor stability and also in acoustic properties while maintaining at least approximately the same bearing housing dimensions.

BRIEF SUMMARY OF THE INVENTION

Said object is achieved by means of the features of claim 1.

In contrast to the prior art, in which at least substantially the compressor-side bearing and the turbine-side bearing are of identical design, the present invention is based on the realization that, to obtain an improvement in the bearing arrangement of the rotor shaft in terms of acoustics and at the same time rotor dynamics, different bearings are provided on the turbine and compressor sides as a result of unequal loadings. On account of the different masses of the compressor wheel and turbine wheel and the spacings thereof from the bearing point, the overall rotor has a center of mass which does not lie in the geometric center between the bearing points, and therefore leads to unequal bearing loadings.

Here, the acoustic properties of the bearing are determined by subharmonic vibrations generated in the oil film. The characteristics of the oil film in turn are determined by the geometric dimensions of the bearings. The variable components of the bearings are basically the rotor shaft to be mounted, the bearing bushes of the bearings, and the bearing housing or those bearing housing regions in which the bearing bushes of the bearing arrangement of the exhaust-gas turbocharger according to the invention are arranged.

For this purpose, it is firstly basically possible for the shaft diameter of the rotor shaft in the region in which the bearing bushes are arranged to be varied, in particular increased in relation to the shaft section between the bearings. For this purpose, a slightly beveled surface may be provided proceeding from the region between the bearings, which beveled surface permits a gradual increase in the shaft diameter. It is alternatively likewise possible to provide a shaft shoulder which permits a stepped increase in shaft diameter.

The bearing bushes themselves may be of different design at the compressor side and turbine side in terms of their outer diameter and/or their inner diameter. It is accordingly possible for the outer diameter and/or the inner diameter either on the compressor side or on the turbine side to be increased or decreased in relation to the in each case other side.

It is also possible for the bearing width at the inside and/or at the outside to be designed differently.

Finally, the shape of the bearing surfaces may be designed differently. It is for example possible for grooves to be formed in one of the bearing surfaces (for example on the compressor side) while the other bearing surface (in this case the turbine-side bearing surface) can be formed without grooves, that is to say with a smooth surface. It is of course likewise possible to provide or omit the grooves on the in each case other side. It is likewise conceivable for grooves to be provided on the outer circumferential surface of the bearing bushes. In this case, too, either the compressor side or the turbine side is provided with grooves or formed without grooves on the outer circumferential surface.

Finally, the receiving bores of the bearing housing for the bearing bushes may be designed differently on the compressor side and on the turbine side. This again relates to the diameter of the receiving bores, the width of the receiving bores and the shape of the receiving bores, wherein it is again possible for grooves to be provided either on the compressor side or on the turbine side and for no grooves to be formed on the other side. For this purpose, it is preferable for sickle-shaped grooves to be provided in the bearing housing bore in that partial circumferential region in which the oil supply bore opens out.

The subclaims relate to advantageous refinements of the invention.

Since the axial extent of the turbine-side oil collecting chamber is utilized for mounting the rotor, it is possible to increase the inner bearing spacing (between the rotor and bearing bushes) without having to change the bearing housing dimensions. Here, the inner overall bearing surface width of the bearing bush is unchanged, but is preferably split into two bearing surface regions. The installation space required for this purpose on the rotor can be obtained by modifying the contact shoulder of the rotor.

It is also possible to use the improved rotor stability to reduce the bearing housing dimensions (reduction of the bearing spacing).

It is also possible for the bearing bush to be of symmetrical design in order to simplify the assembly of the bearing arrangement.

BRIEF DESCRIPTION OF THE SEVERAL VIEWS OF THE DRAWINGS

Further details, advantages and features of the present invention will emerge from the following description of exemplary embodiments on the basis of the appended drawing, in which.

DETAILED DESCRIPTION OF THE INVENTION

A first embodiment of the exhaust-gas turbocharger 1 according to the invention will be explained below on the basis of FIGS. 1 to 3. The exhaust-gas turbocharger 1 is illustrated in schematically simplified form in FIG. 1. Said exhaust-gas turbocharger 1 has a compressor 2, a turbine 3 and a bearing housing 4. The bearing housing 4 is connected at one end to the compressor 2 and at the other, turbine-side end 5 to the turbine 3. The bearing housing 4 comprises an oil collecting chamber 6 at the turbine-side end 5 and a bearing arrangement 7 for a rotor shaft 8, wherein the bearing arrangement 7 has a compressor-side bearing bush and, spaced apart axially from the latter, a turbine-side bearing bush 10. As can be seen from FIGS. 2 and 3, the turbine-side bearing bush 10 has an inner bearing surface 11 and an outer circumferential surface 12. The bearing is a plain or conventional bearing, e.g., a radial, hydrodynamic, rotating or non-rotating, with one or two bushes) as distinguished from a roller bearing.

Figure 1:
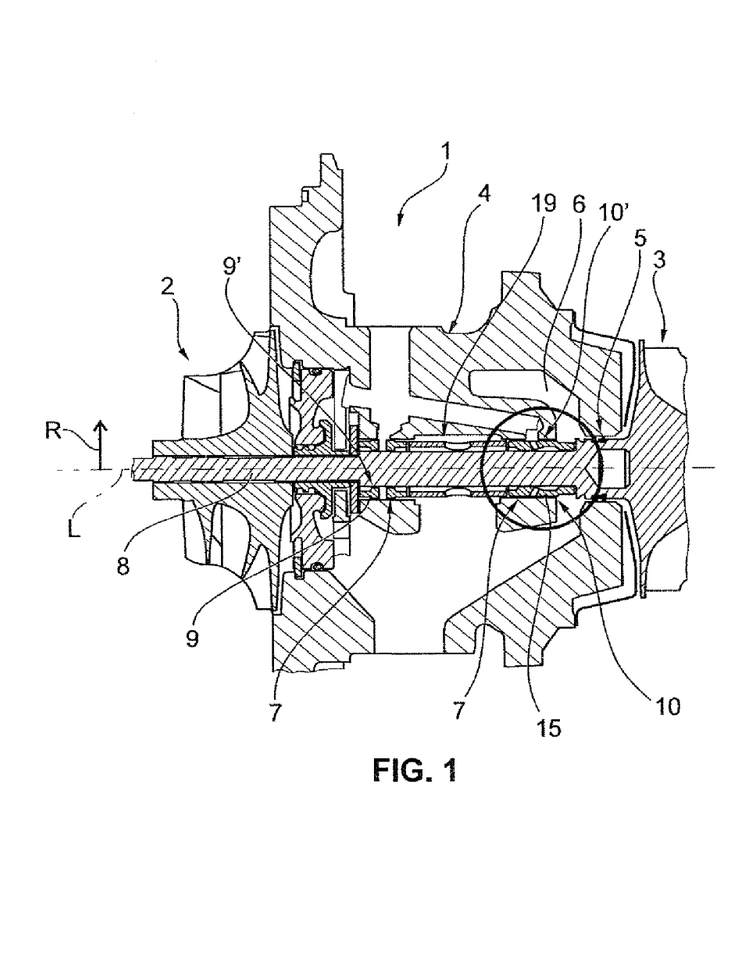
FIG. 1 shows a schematically slightly simplified illustration of a first embodiment of an exhaust-gas turbocharger according to the invention.
Figure 2:
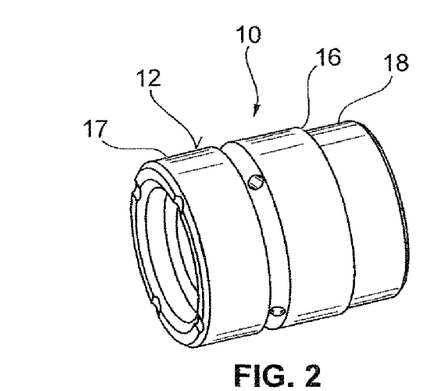
FIG. 2 shows an enlarged perspective illustration of a turbine-side bearing bush circled in FIG. 1.

As illustrated by a circled region of FIG. 1, the turbine-side bearing bush 10 extends into the region of the oil collecting chamber 6. The utilization of the oil collecting chamber 6 for the axial extent of the bearing bush 10 has the advantage that the rotor stability is improved as a result of the increase in the inner bearing spacing between the rotor and bearing bushes.

Figure 3:
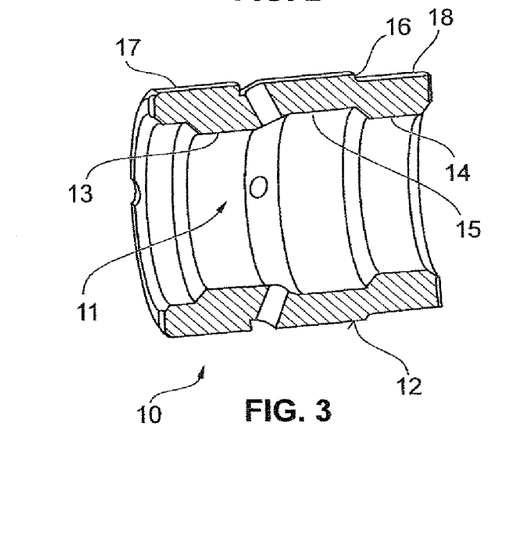
FIG. 3 shows a sectional illustration of the bearing bush according to FIG. 2.

As illustrated in FIG. 3, the inner bearing surface 11 is split into two spaced-apart bearing surface regions 13, 14, wherein the bearing surface regions 13, 14 are separated from one another by a radially outwardly recessed clearance 15. Despite the split into two bearing surface regions 13, 14, the overall bearing surface width of the bearing bush remains unchanged. The definition "radially outwardly" is to be understood here to mean an offset in the direction of the arrow R which is at right angles to the longitudinal axis L of the turbocharger 1 (see FIG. 1).

Figure 8:
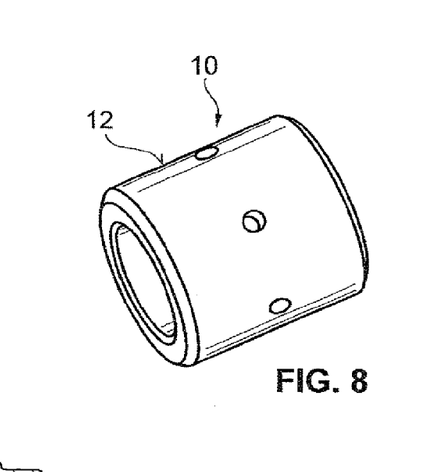
FIG. 8 shows an illustration, corresponding to FIGS. 2 and 5, of an alternative embodiment of the turbine-side bearing bush.
Figure 9:
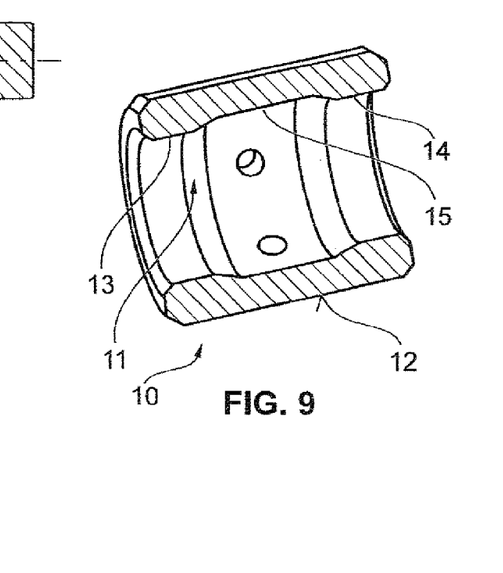
FIG. 9 shows a sectional illustration, corresponding to FIGS. 3 and 6, of the bearing bush according to FIG. 8.

In a second embodiment, the turbine-side bearing bush 10 is of symmetrical design with a continuous outer circumferential surface 12, as shown in FIG. 8.

Figure 5:
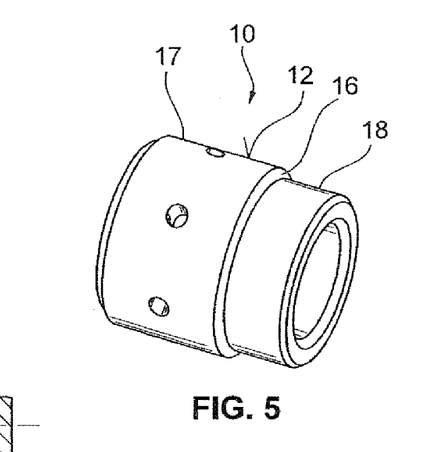
FIG. 5 shows an illustration, corresponding to FIG. 2, of a turbine-side bearing bush circled in FIG. 4.
Figure 6:
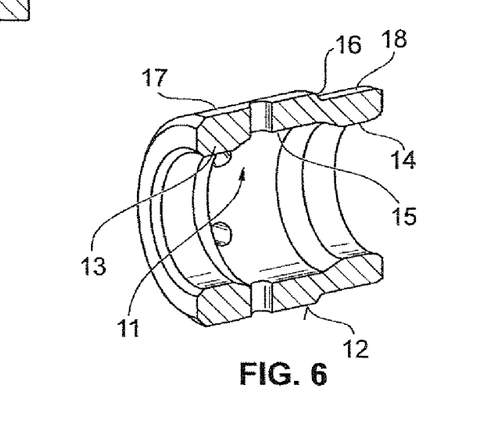
FIG. 6 shows a sectional illustration, corresponding to FIG. 3, of the bearing bush according to FIG. 5.

As shown in the illustration of FIG. 5, in a further embodiment, the turbine-side bearing bush 10 is formed with an outer circumferential surface 12 divided by a shoulder 16 into two outer circumferential surface regions 17, 18.

In the following embodiments of the exhaust-gas turbocharger 1 according to the invention, explained on the basis of FIGS. 10 to 15, the corresponding technical features are denoted by the same reference numerals as in the preceding embodiments, such that with regard to said corresponding features, reference may be made to the description above.

Figure 10:
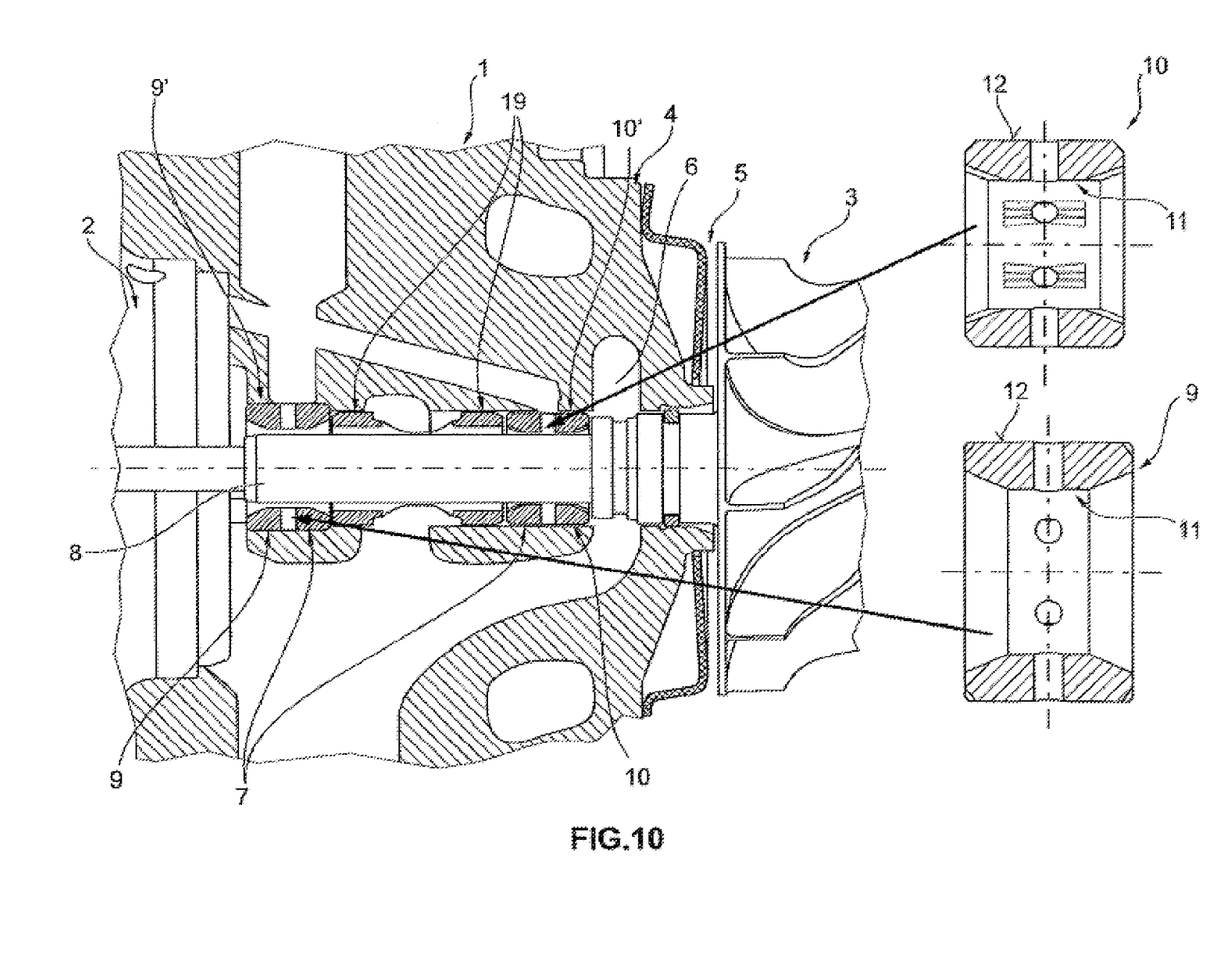
FIG. 10 shows an illustration, corresponding to FIG. 1, of a fourth embodiment of the exhaust-gas turbocharger according to the invention.

FIG. 10 shows a variation of the inner and outer diameters of the bearing bushes 9 and 10. As a result of the increases in diameter on the compressor side (bearing bush 9), the inner lubricating gap is made larger and the outer gap is made smaller.

Figure 11:
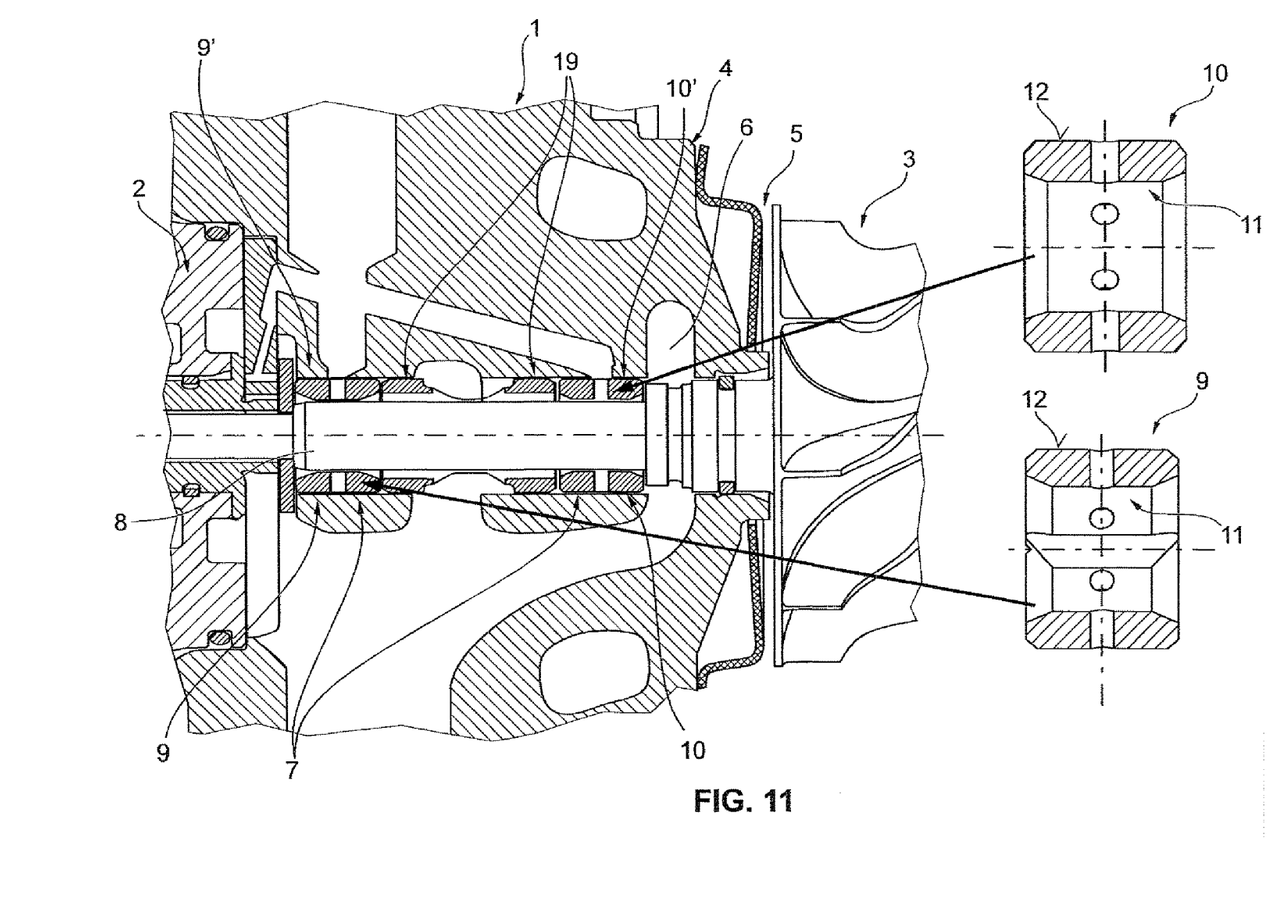
FIG. 11 shows an illustration, corresponding to FIG. 1, of a fifth embodiment of the exhaust-gas turbocharger according to the invention.

FIG. 11 illustrates the bearing bushes 9 and 10 with a modified form of the inner bearing surface 11, by means of the formation of an axially parallel axial groove or a groove which runs in spiral fashion in the axial direction.

Figure 12:
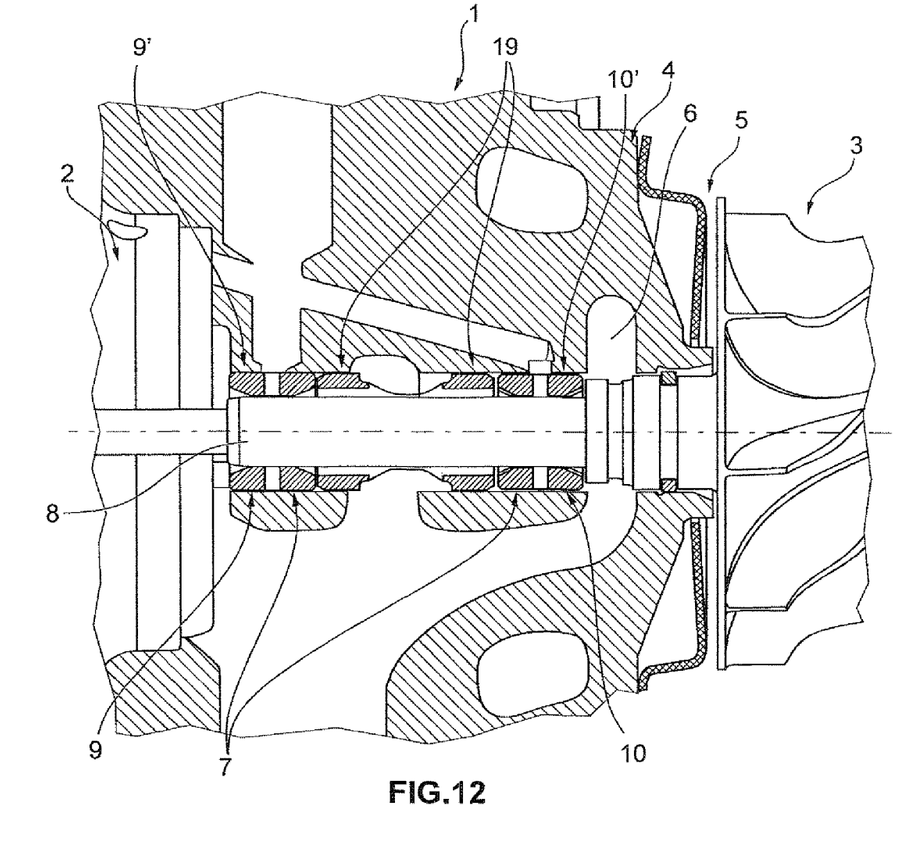
FIG. 12 shows an illustration, corresponding to FIG. 1, of a sixth embodiment of the exhaust-gas turbocharger according to the invention.
Figure 13:
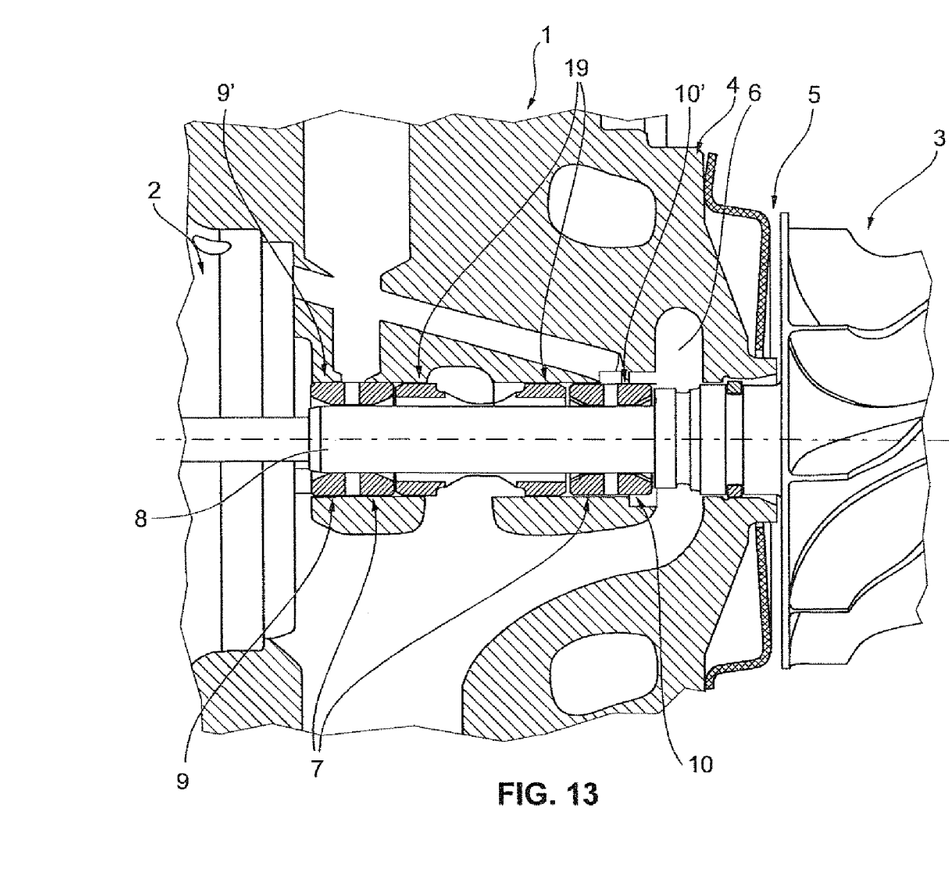
FIG. 13 shows an illustration, corresponding to FIG. 1, of a seventh embodiment of the exhaust-gas turbocharger according to the invention.
Figure 14:
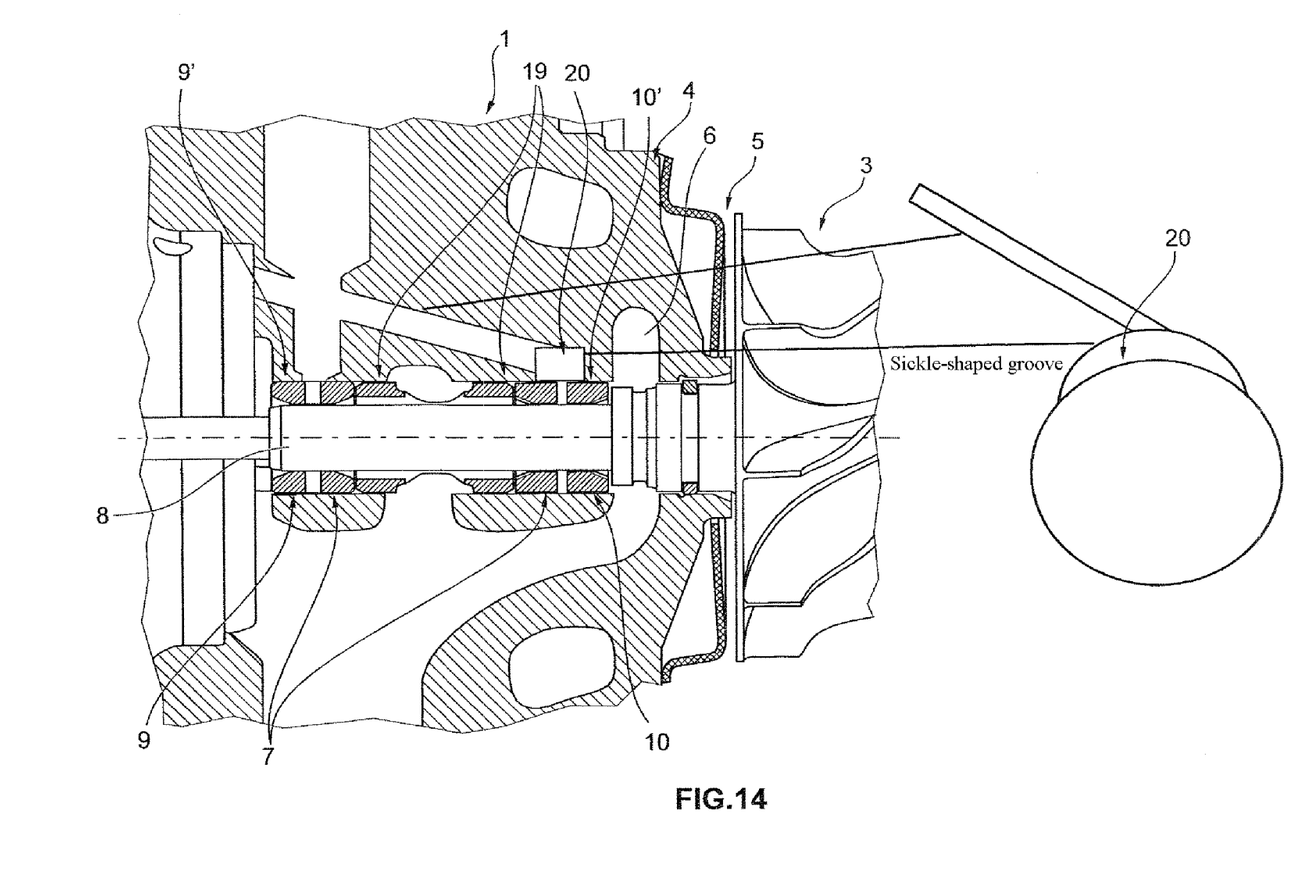
FIG. 14 shows an illustration, corresponding to FIG. 1, of an eighth embodiment of the exhaust-gas turbocharger according to the invention.

FIG. 12 shows the possible influences of the bearing housing bore on the oil film. Firstly, the diameter at the bearing points 9' and 10' of the compressor side and turbine side may be selected to be different, and secondly, the outer bearing point width can be influenced, as illustrated in FIG. 13. FIG. 14 shows the modification of the bearing surface form by means of a sickle-shaped groove 20. Here, in one circumferential segment of the bearing point bore, a groove for better distribution of the supplied oil is formed in the region of the oil supply bore by means of eccentric machining.

Figure 15:
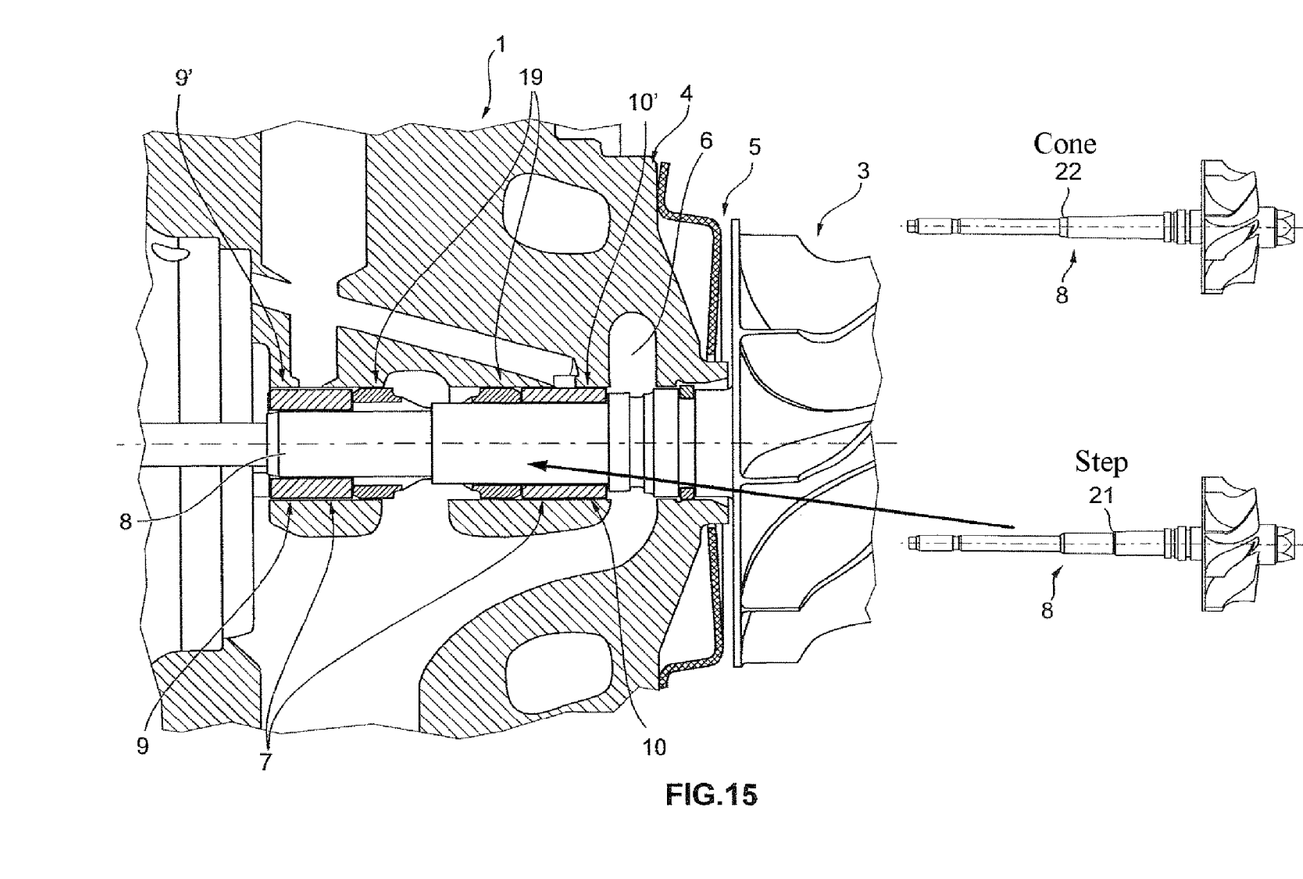
FIG. 15 shows an illustration, corresponding to FIG. 1, of a ninth embodiment of the exhaust-gas turbocharger according to the invention.

FIG. 15 shows different geometries of the rotor shaft 8 for influencing the inner lubricating gap. Here, the shaft 8 may have a changed diameter at the bearing points 9', 10', which changed diameter is realized either by a step 21 or by a conical transition 22.

Figure 16:
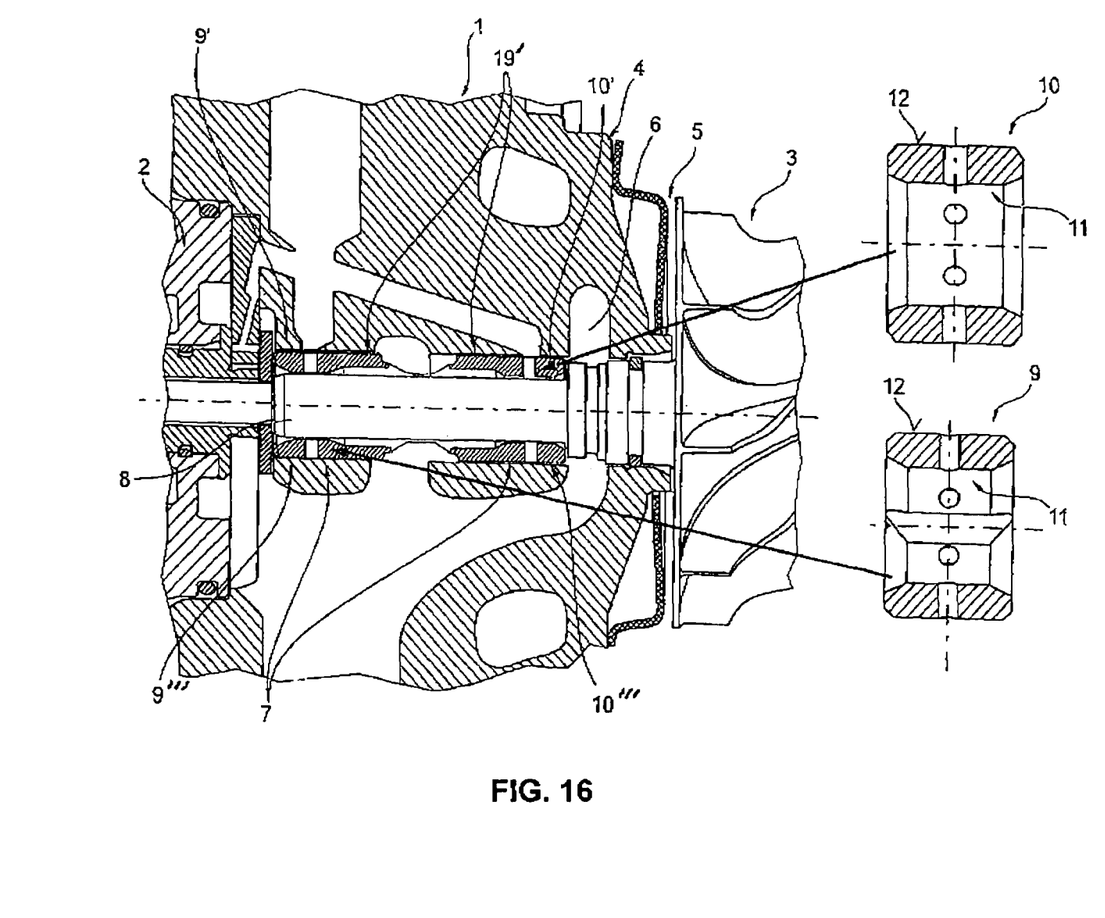
FIG. 16 shows an illustration, corresponding to FIG. 11, but with the two bearings and bearing spacer combined into a unitary bearing and spacer.

FIG. 16 shows the an exhaust-gas turbocharger (1) corresponding to FIG. 11, but wherein the bearing bushes (9''', 10''') and spacer arrangement (19') are combined to form one component.

All the illustrated possible variations may be combined without restriction, such that different designs are realized in each case on the compressor side and on the turbine side.

Figure 4:
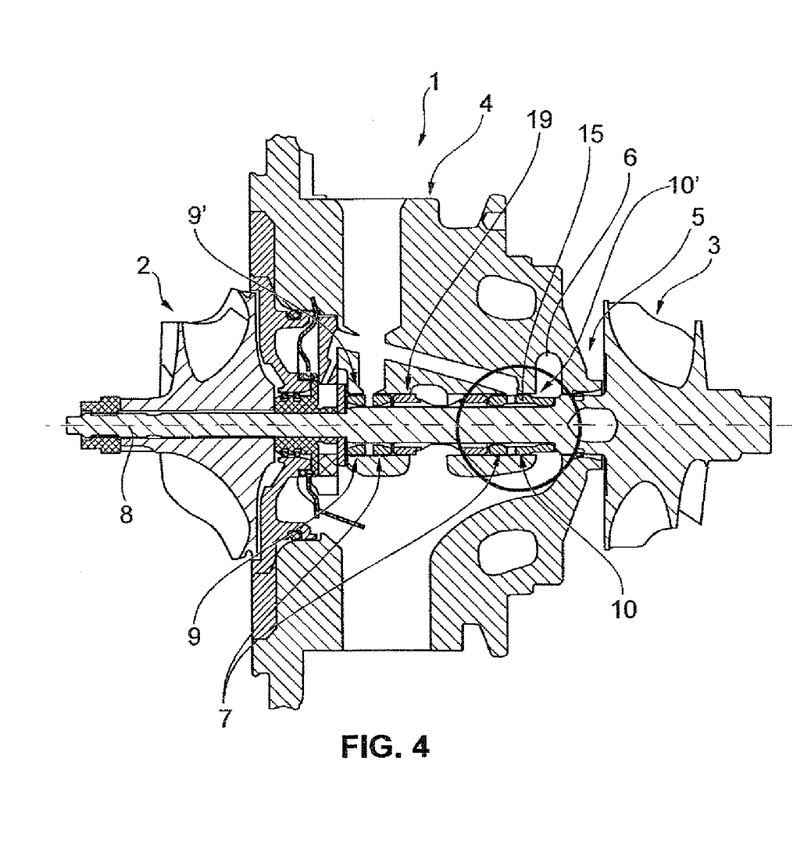
FIG. 4 shows an illustration, corresponding to FIG. 1, of a second embodiment of the exhaust-gas turbocharger according to the invention.
Figure 7:
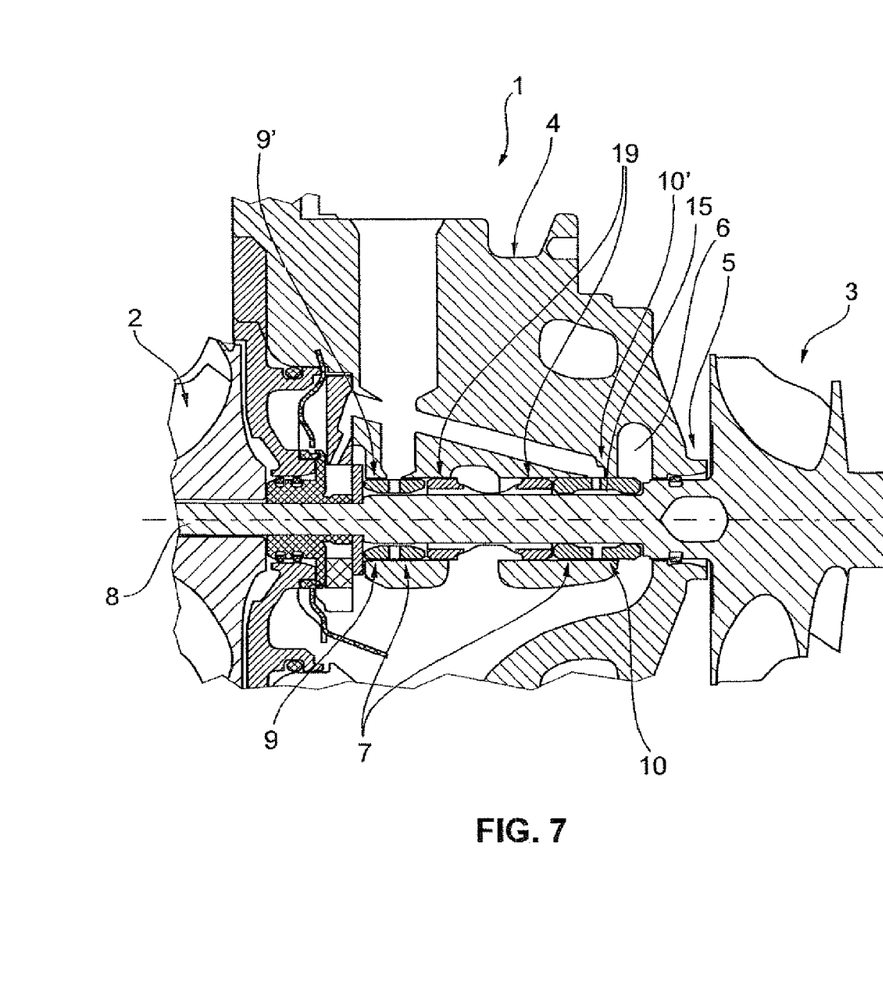
FIG. 7 shows an illustration, corresponding to FIGS. 1 and 4, of a third embodiment of the exhaust-gas turbocharger according to the invention.

Furthermore, the bearing bushes 9, 10 are held axially spaced apart along the rotor shaft 8 by means of a spacer 19, as illustrated in FIGS. 1, 4 and 7.

In addition to the above written disclosure of the invention, reference is made explicitly to the diagrammatic illustration in FIGS. 1 to 15.

LIST OF REFERENCE SYMBOLS

1 Exhaust-gas turbocharger
2 Compressor
3 Turbine
4 Bearing housing
5 Turbine-side end
6 Oil collecting chamber
7 Bearing arrangement/plain bearing arrangement
8 Rotor shaft
9 Compressor-side bearing bush
9' Compressor-side bearing/bearing point
9" Compressor-side receiving bore in the bearing housing
10 Turbine-side bearing bush 10' Turbine-side bearing/bearing point
10" Turbine-side receiving bore in the bearing housing
11 Inner bearing surface
12 Outer circumferential surface
13, 14 Spaced-apart bearing surface regions
15 Recessed clearance
16 Shoulder
17, 18 Outer circumferential surface regions
19 Spacer arrangement
20 Sickle-shaped groove
21 Step
22 Conical transition
R Direction of the offset of the clearance 15
L Longitudinal axis

The invention claimed is:

1. An exhaust-gas turbocharger (1) having
a compressor (2) comprising a compressor housing;
a turbine (3) comprising a turbine housing;
a bearing housing (4)
  which is connected at one end to the compressor housing and at the other end to the turbine housing, and
  which has an oil supply, and which has an oil collecting chamber (6) at a turbine-side end (5) and
  which has a bearing arrangement (7) for a rotor shaft (8), which bearing arrangement comprises:
    turbine-side and compressor-side receiving bores (9", 10"),
    a compressor-side bearing bush (9) with a radially inner bearing surface forming a gap with the rotor shaft (8) and a radially outer circumferential surface facing the compressor-side receiving bore (9"), and
    a turbine-side bearing bush (10) which is spaced apart axially from the compressor-side bearing bush (9) and which has a radially inner bearing surface (11) forming a gap with the rotor shaft (8) and a radially outer circumferential surface (12) facing the turbine-side receiving bore (10"),
wherein
  the inner axial bearing surface width of the compressor-side bearing bush (9) differs from the inner axial bearing surface width of the turbine-side bearing bush (10),
  the outer axial bearing surface width of the compressor-side bearing bush (9) differs from the outer axial bearing surface width of the turbine-side bearing bush (10) or
  the inner axial bearing surface width of the compressor-side bearing bush (9) differs from the inner axial bearing surface width of the turbine-side bearing bush (10) and the outer axial bearing surface width of the compressor-side bearing bush (9) differs from the outer axial bearing surface width of the turbine-side bearing bush (10).

2. The exhaust-gas turbocharger (1) as claimed in claim 1, wherein the outer diameter of the rotor shaft (8) in the region of the compressor-side bearing bush (9') and/or the outer diameter of the rotor shaft (8) in the region of the turbine-side bearing bush (10) is larger than the rotor shaft diameter between the bearing bushes (9, 10).

3. The exhaust-gas turbocharger (1) as claimed in claim 2, wherein the diameter enlargement is realized by the provision of a slight bevel or by the provision of a shaft shoulder.

4. The exhaust-gas turbocharger (1) as claimed in claim 1, wherein the compressor-side bearing bush (9) outer diameter is larger or smaller than the outer diameter of the turbine-side bearing bush (10).

5. The exhaust-gas turbocharger (1) as claimed in claim 4, wherein the inner diameter of the compressor-side bearing bush (9) is larger or smaller than the inner diameter of the turbine-side bearing bush (10).

6. The exhaust-gas turbocharger (1) as claimed in claim 1, wherein the inner bearing surfaces (11) and/or the outer bearing surfaces (17) of the bearing bushes (9, 10) are of different design.

7. The exhaust-gas turbocharger (1) as claimed in claim 1, wherein receiving bores (9", 10") for the bearing bushes (9, 10) in the bearing housing (4) are of different design with regard to bore diameter and/or bore width.

8. The exhaust-gas turbocharger (1) as claimed in claim 1, wherein inner surfaces of the receiving bores of the bearing housing (4) are of different design.

9. The exhaust-gas turbocharger (1) as claimed in claim 1, wherein the turbine-side bearing bush (10) extends into the region of the oil collecting chamber (6).

10. The exhaust-gas turbocharger (1) as claimed in claim 1, wherein the radially inner bearing surface (11) of the compressor-side bearing bush (9) or the turbine-side bearing bush (10) is split into two spaced-apart bearing surface regions (13, 14).

11. The exhaust-gas turbocharger (1) as claimed in claim 10, wherein the bearing surface regions (13, 14) are separated from one another by a radially outwardly recessed clearance (15).

12. The exhaust-gas turbocharger (1) as claimed in claim 1, wherein the turbine-side bearing bush (10) is of symmetrical design with a continuous outer circumferential surface (12).

13. The exhaust-gas turbocharger (1) as claimed in claim 1, wherein an outer circumferential surface (12) of the turbine-side bearing bush (10) is split into two outer circumferential surface regions (17, 18) by a shoulder (16), one outer circumferential region (17) having a greater outer diameter, the other outer circumferential region (18) having a smaller outer diameter.

14. The exhaust-gas turbocharger (1) as claimed in claim 1, wherein the bearing bushes (9, 10) are held spaced apart axially along the rotor shaft (8) by a spacer arrangement (19).

15. The exhaust-gas turbocharger (1) as claimed in claim 1, wherein the bearing bushes (9, 10), spaced apart axially by means of a spacer arrangement (19), are combined to form one component.

16. The exhaust-gas turbocharger (1) as claimed in claim 1, wherein inner surfaces of the receiving bores of the bearing housing (4) are of different design and are provided with a sickle-shaped groove (20) arranged on circumferential segments.

17. The exhaust-gas turbocharger (1) as claimed in claim 1, wherein the inner axial bearing surface width of the compressor-side bearing bush (9) differs from the inner axial bearing width of the turbine-side bearing bush (10).

18. The exhaust-gas turbocharger (1) as claimed in claim 1, wherein the outer axial bearing surface width of the compressor-side bearing bush (9) differs from the outer axial bearing surface width of the turbine-side bearing bush (10).

19. The exhaust-gas turbocharger (1) as claimed in claim 1, wherein the inner and outer axial bearing surfaces width of the compressor-side bearing bush (9) differ from the inner and outer axial bearing surfaces width of the turbine-side bearing bush (10).

\* \* \* \* \*